United States Patent
Waki et al.

(10) Patent No.: US 7,622,221 B2
(45) Date of Patent: Nov. 24, 2009

(54) NON-AQUEOUS ELECTROLYTE SECONDARY BATTERY AND POSITIVE ELECTRODE ACTIVE MATERIAL THEREFOR

(75) Inventors: Shinichi Waki, Osaka (JP); Youko Sano, Osaka (JP); Yasuhiko Bito, Osaka (JP); Tetsuo Nanno, Osaka (JP)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 11/546,343

(22) Filed: Oct. 12, 2006

(65) Prior Publication Data

US 2007/0082266 A1    Apr. 12, 2007

(30) Foreign Application Priority Data

Oct. 12, 2005    (JP)    ............... 2005-297752

(51) Int. Cl.
*H01M 4/50* (2006.01)
*H01M 4/02* (2006.01)
*H01M 4/58* (2006.01)

(52) U.S. Cl. .............. 429/224; 429/209; 429/218.1
(58) Field of Classification Search .......... 429/224, 429/218.1
See application file for complete search history.

(56) References Cited

U.S. PATENT DOCUMENTS

| | | | |
|---|---|---|---|
| 5,316,877 A | 5/1994 | Thackeray et al. | |
| 5,601,952 A * | 2/1997 | Dasgupta et al. | 429/224 |
| 5,700,597 A * | 12/1997 | Zhong et al. | 429/231.1 |
| 6,040,089 A * | 3/2000 | Manev et al. | 429/231.1 |
| 7,026,070 B2 | 4/2006 | Noguchi et al. | |
| 7,311,996 B2 * | 12/2007 | Ito et al. | 429/209 |
| 2003/0108794 A1 | 6/2003 | Park et al. | |
| 2004/0062990 A1 | 4/2004 | Shimamura et al. | |
| 2007/0122338 A1 | 5/2007 | Park et al. | |
| 2007/1227708 | 5/2007 | Shimamura et al. | |

FOREIGN PATENT DOCUMENTS

| | | |
|---|---|---|
| CN | 1412872 | 4/2003 |
| CN | 1459131 | 11/2003 |
| CN | 1495938 | 5/2004 |
| CN | 2652014 | 10/2004 |

OTHER PUBLICATIONS

Chinese Office Action with English Translation issued in Chinese Patent Application No. 2006101318290 dated on Mar. 21, 2008.
Chinese Office Action issued in Patent Application No. 2006101318290 dated on Aug. 15, 2008.

* cited by examiner

*Primary Examiner*—Dah-Wei D Yuan
*Assistant Examiner*—Zachary Best
(74) *Attorney, Agent, or Firm*—McDermott Will & Emery LLP (57) ABSTRACT

A positive electrode active material for a non-aqueous electrolyte secondary battery including a manganese oxide having a spinel structure, wherein the manganese oxide is represented by the general formula: $Li_{1+a}Mn_{2-x-a}M_xO_{4+y}$, where M is a transition metal element having an oxidation number of 2 or greater, $M \neq Mn$, $0.17 \leq x \leq 0.5$, $-0.2 \leq y \leq 0.5$ and $0 \leq a \leq 0.2$.

14 Claims, 7 Drawing Sheets

NON-AQUEOUS ELECTROLYTE SECONDARY BATTERY AND POSITIVE ELECTRODE ACTIVE MATERIAL THEREFOR

FIELD OF THE INVENTION

The present invention relates to the field of non-aqueous electrolyte secondary batteries. More particularly, the invention relates to a positive electrode active material for a non-aqueous electrolyte secondary battery comprising a manganese oxide having a spinel structure.

BACKGROUND OF THE INVENTION

Non-aqueous electrolyte secondary batteries, which have been utilized as main power sources for mobile communication devices and portable electronic devices in recent years, are characterized by high electromotive force and high energy density. As the positive electrode for non-aqueous electrolyte secondary batteries, lithium-containing composite oxide having a layered structure is mainly used. Particularly, lithium cobalt oxide ($LiCoO_2$) and lithium nickel oxide ($LiNiO_2$) have a potential of 4 V or higher relative to that of metallic lithium.

Attempts to use a manganese oxide having a spinel structure as a positive electrode active material for non-aqueous electrolyte secondary batteries have also been actively made. For example, the use of $LiMn_2O_4$, $Li_4Mn_5O_{12}$ and $Li_2Mn_4O_9$ has been proposed.

Attention has been given to $LiMn_2O_4$ because it is inexpensive and because reduction in production cost for non-aqueous electrolyte secondary batteries is achieved. When a battery containing $LiMn_2O_4$ is repeatedly charged and discharged at around 3 V, however, the discharge capacity decreases significantly. This is presumably due to a change of crystal structure caused by Jahn-Teller distortion.

The crystal structures of $Li_4Mn_5O_{12}$ and $Li_2Mn_4O_9$, on the other hand, are relatively unlikely to undergo Jahn-Teller distortion. The crystal structure of $Li_2Mn_4O_9$, in particular, has vacancy in the cation sites, and therefore $Li_2Mn_4O_9$ has high capacity density. However, the discharge capacity decreases significantly when these oxides are repeatedly charged and discharged at around 3 V.

U.S. Pat. No. 5,316,877 proposes the use of $LiD_{x/b}Mn_{2-x}O_{4+\delta}$, where D is a metal element having an oxidation number of one or greater, $0<x\leq0.33$, $0\leq\delta<0.5$, and b represents the oxidation number of element D. This document proposes that the element D be Li, Mg or Co. According to this proposal, it is possible to prevent the decrease of discharge capacity during repetitive charge/discharge cycles at around 4 V, but the discharge capacity during repetitive charge/discharge cycles at around 3 V is not sufficient.

In repetitive charge/discharge cycles at around 4 V, the decrease of discharge capacity is caused by the dissolution of $Mn^{2+}$. $Mn^{2+}$ is produced through a disproportionation reaction ($Mn^{3+}\rightarrow Mn^{4+}+Mn^{2+}$). A part of Mn in the manganese oxide having a spinel structure is replaced with Li, Mg or Co, whereby the valence of Mn increases. Accordingly, $Mn^{3+}$ decreases, which prevents the discharge capacity from decreasing.

In repetitive charge/discharge cycles at around 3 V, on the other hand, the decrease of discharge capacity is caused by Jahn-Teller distortion. The Jahn-Teller distortion is considered to occur when the valence of Mn decreases to 3.5 or less. A part of Mn in the manganese oxide having a spinel structure is replaced with Li, Mg or Co, whereby the valence of Mn increases, and thus the Jahn-Teller distortion is prevented.

Even after the element replacement, however, the distortion still occurs to some extent. In other words, it is difficult to prevent the decrease of discharge capacity caused by Jahn-Teller distortion.

BRIEF SUMMARY OF THE INVENTION

An object of the present invention is to prevent the decrease of discharge capacity of a manganese oxide having a spinel structure during repetitive charge/discharge cycles at around 3 V, e.g., in the range of 3.5 V to 2.5 V. Specifically, an object of the present invention is to improve cycle life characteristics of a non-aqueous electrolyte secondary battery when the battery is repeatedly charged and discharged at around 3 V.

The present invention relates to a positive electrode active material for a non-aqueous electrolyte secondary battery comprising: a manganese oxide having a spinel structure, wherein the manganese oxide is represented by the general formula: $Li_{1+a}M_{2-x-a}O_{4+y}$. In this general formula, the element M is a transition metal element having an oxidation number of 2 or greater. The element M should not be Mn ($M\neq Mn$). The general formula satisfies $0.17\leq x\leq0.5$, $-0.2\leq y\leq0.5$ and $0\leq a\leq0.2$. According to the present invention, it is possible to improve the cycle life characteristics of a non-aqueous electrolyte secondary battery when the battery is repeatedly charged and discharged at around 3 V.

The transition metal element (element M) preferably comprises at least one selected from the group consisting of Ni, Fe and Ti. The inclusion of these elements further improves the cycle life characteristics as well as the capacity.

The manganese oxide preferably has a lattice constant of 8.16 to 8.2 angstroms (Å).

The manganese oxide preferably has an average particle size (volume based median size: D50) of 1 to 30 nm.

When the positive electrode active material is charged using a counter electrode comprising a metal lithium, a charge capacity of the positive electrode active material obtained until a potential thereof relative to the counter electrode reaches 2.5 to 3.0 V is 110 mAh/g or more.

The present invention further relates to a non-aqueous electrolyte secondary battery comprising: a positive electrode containing the above-described positive electrode active material, a negative electrode containing a negative electrode active material, and a lithium ion-conductive non-aqueous electrolyte, wherein the negative electrode active material comprises silicon element.

The negative electrode active material preferably comprises at least one selected from the group consisting of silicon simple substance, a silicon oxide, a silicon carbide, a silicon nitride and a silicon alloy.

The silicon alloy preferably comprises a phase A composed mainly of silicon and a phase B comprising an intermetallic compound comprising a transition metal element and silicon element. The transition metal element contained in the phase B preferably comprises at least one selected from the group consisting of Ti, Zr, Ni, Cu and Fe.

The intermetallic compound contained in the phase B preferably comprises $TiSi_2$.

The present invention further relates to a charge/discharge system comprising: a non-aqueous electrolyte secondary battery, a charger for charging the non-aqueous electrolyte secondary battery, and a discharge controller for the non-aqueous electrolyte secondary battery, wherein the non-aqueous electrolyte secondary battery comprises a positive electrode containing a positive electrode active material, a negative electrode containing a negative electrode active material and a lithium ion-conductive non-aqueous electrolyte, the positive electrode active material comprises a manganese oxide having a spinel structure, the manganese oxide represented by the general formula: $Li_{1+a}Mn_{2-x-a}M_xO_{4+y}$, where element M is a transition metal element having an oxidation number of 2 or greater, M≠Mn, $0.17 \leq x \leq 0.5$, $-0.2 \leq y \leq 0.5$ and $0 \leq a \leq 0.2$, the negative electrode active material comprises silicon element, and the charger is set to have an end-of-charge voltage of the battery of 3.5 V or less, and the discharge controller is set to have an end-of-discharge voltage of the battery of 2.5 V or greater.

According to the present invention, it is possible to obtain a non-aqueous electrolyte secondary battery having excellent cycle life characteristics when the battery is repeatedly charged and discharged at around 3 V. In the present invention, compared to conventional positive electrode active materials, a relatively large amount of Mn is replaced with the element M, that is, $0.17 \leq x$ is satisfied. Presumably, this effectively prevents the Jahn-Teller distortion of manganese oxide.

It is particularly advantageous that the transition metal element (element M) comprise at least one selected from the group consisting of Ni, Fe and Ti. The use of these elements improves the cycle life characteristics significantly. At the same time, an improvement of capacity can also be expected.

The lattice constant of the manganese oxide is preferably as small as possible. The smaller the lattice constant, the more stable the crystal structure of the manganese oxide becomes. Accordingly, the Jahn-Teller distortion is prevented. Particularly when the lattice constant is 8.16 to 8.2 angstroms, the improvement of cycle life characteristics becomes apparent.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A positive electrode active material for a non-aqueous electrolyte secondary battery of the present invention comprises a manganese oxide having a spinel structure. The manganese oxide is represented by the general formula (1): $Li_{1+a}Mn_{2-x-a}O_{4+y}$, where element M is a transition metal element having an oxidation number of 2 or greater, M≠Mn, $0.17 \leq x \leq 0.5$, $-0.2 \leq y \leq 0.5$ and $0 \leq a \leq 0.2$. In other words, the manganese oxide according to the present invention has a crystal structure in which a relatively large amount of Mn is replaced with the element M. Such crystal structure is very stable, so that the Jahn-Teller distortion is considered unlikely to occur. Accordingly, satisfactory cycle life characteristics are obtained.

The element M is a transition metal element having an oxidation number of 2 or greater. The transition metal element is preferably, but not limited to, an element having an ionic radius similar to that of Mn.

Further, an element that can contribute to capacity by oxidation and reduction reactions is preferred. For example, the element M can be Ni, Fe, Ti, Mo, W or Cr. Among them, particularly preferred are Ni, Fe and Ti. When the element M comprises at least one selected from the group consisting of Ni, Fe and Ti, cycle life characteristics and capacity improve very significantly.

In view of the foregoing, the manganese oxide is preferably represented by the general formula (1'): $Li_{1+a}Mn_{2-\alpha-\beta-a}M^1_\alpha M^2_\beta O_{4+y}$, where element $M^1$ is at least one selected from the group consisting of Ni, Fe and Ti, element $M^2$ is a transition metal element having an oxidation number of 2 or greater except Ni, Fe and Ti, $\alpha+\beta=x$, $0<\alpha$, $0 \leq \beta$, $0.17 \leq x \leq 0.5$, $-0.2 \leq y \leq 0.5$ and $0 \leq a \leq 0.2$. In this case, in order to significantly improve cycle life characteristics and capacity, preferably, $0 \leq 100\beta/(\alpha+\beta) \leq 50$ is satisfied, and more preferably, $0 \leq 100\beta/(\alpha+\beta) \leq 30$ is satisfied.

If the value of "x" in the general formula (1) representing the amount of M is less than 0.17, the discharge capacity decreases significantly when repeatedly charged and discharged at around 3 V. Conversely, if the value of "x" exceeds 0.5, the resulting positive electrode active material will have an insufficient capacity density. The best balance of cycle life characteristics and capacity is obtained when the value of "x" satisfies $0.17 \leq x \leq 0.4$.

When the element M is Ni or Fe, the above range of "x" may be extended. For example, an manganese oxide represented by the general formula (1''): $Li_{1+a}M_{2-\alpha-\beta-a}M^1_\alpha M^2_\beta O_{4+y}$, where element $M^1$ is at least one selected from the group consisting of Ni and Fe, element $M^2$ is a transition metal element having an oxidation number of 2 or greater except Ni and Fe, $\alpha+\beta=x$, $0<\alpha$, $0 \leq \beta$, $0.1 \leq x \leq 0.5$, $\leq 0.2 \leq y \leq 0.5$ and $0 \leq a \leq 0.2$ is also suitable for a positive electrode active material for a non-aqueous electrolyte secondary battery of the present invention.

The value of "a" in the general formula (1) representing the amount of lithium which replaces Mn can be 0 to 0.2. If the value of "a" exceeds 0.2, the discharge capacity decreases. Conversely, if the value of "a" is less than 0 (a<0), Mn or the element M will be located in the 8a sites which are normally occupied by Li. The Li of the 8a sites contributes to charge/discharge reaction. Accordingly, when the Li of the 8a sites is replaced with a different element, the discharge capacity decreases. For this reason, the vale of "a" is preferably greater than 0 (0<a). The value of "a" is preferably $0 \leq a \leq 0.15$.

The value of "y" in the general formula (1) representing the variation of oxygen amount can be −0.2 to 0.5. To set the value of "y" to be above 0.5, the valence of Mn or that of the element to be added needs to be 4 or greater, which makes the synthesis of active material difficult. To impart cation deficiency to the manganese oxide and to prevent the Jahn-Teller distortion, the value of "y" is preferably greater than 0 (0<y). Preferably, the value of "y" is $0<y \leq 0.5$.

The manganese oxide preferably has a lattice constant of 8.16 to 8.2 angstroms, and more preferably 8.17 to 8.19 angstroms. The manganese oxide of the present invention has a cubic system, which has only one lattice constant. The effect of preventing the Jahn-Teller distortion increases as the lattice constant becomes smaller. However, it is practically difficult to have a lattice constant of less than 8.16 angstroms. If the lattice constant exceeds 8.2 angstroms, the cycle life characteristics tend to decrease.

The manganese oxide is preferably in the form of massive particles (particles having no regular shapes). To the surface of the massive particles, fine particles having a size of 0.05 to 1 μm may be attached.

The manganese oxide has an average particle size (volume based median size: D50) of, for example, 1 to 30 μm, and preferably 5 to 20 μm. If the average particle size is too large, the discharge capacity decreases. If the average particle size is too small, larger amounts of conductive aid and binder are needed during production of electrode, and the active material density will be low. The average particle size can be determined from a volume based particle size distribution measured by a laser diffraction particle size analyzer. A particle size at 50% accumulation in a particle size distribution based on volume (median size: D50) refers to the average particle size.

When a battery assembled by using a working electrode comprising the positive electrode active material of the present invention immediately after production and a counter electrode comprising a metal lithium is charged, the charge capacity of the working electrode obtained until a potential relative to the counter electrode reaches 2.5 to 3.0 V is, for example, 110 mAh/g or more including the irreversible capacity. When the element M is Ni, Fe or Ti, it is possible to achieve a further higher capacity of 120 mAh/g or more, or 130 mAh/g or more including the irreversible capacity.

A description is now given of a method for producing the manganese oxide having a spinel structure of the present invention.

The manganese oxide is obtained by, for example, mixing manganese dioxide, a lithium salt and a salt of element M at a specified molar ratio, after which the mixture is baked at 300 to 600° C. in the air for 5 to 24 hours. As the manganese dioxide, electrolytic manganese dioxide is preferably used.

As the lithium salt, preferred are lithium hydroxide and lithium carbonate. The salt of element M can be, for example, hydroxide, nitrate, carbonate, sulfate, acetate or oxide.

When the element M is Ni, nickel hydroxide or nickel carbonate is preferably used. When the element M is Fe, iron (III) hydroxide or iron (III) oxyhydroxide is preferably used. When the element M is Ti, titanic acid or tetramethoxytitanium is preferably used.

The positive electrode active material of the present invention is suitable for charge/discharge having a plateau region at around 3 V. Accordingly, the non-aqueous electrolyte secondary battery of the present invention is preferably designed such that the positive electrode active material is charged and discharged in a potential range between 2.5 to 3.5 V, or between 2.7 to 3.0 V relative to Li metal. With the use of the positive electrode active material of the present invention, it is possible to provide a non-aqueous electrolyte secondary battery that can offer high capacity even when charged at a voltage of around 3 V.

The following describes a non-aqueous electrolyte secondary battery of the present invention comprising a positive electrode containing the above-described positive electrode active material, a negative electrode containing a negative electrode active material, and a lithium ion-conductive non-aqueous electrolyte. The shape of the non-aqueous electrolyte secondary battery is not specifically limited. The present invention is applicable to any battery such as coin-type battery, cylindrical battery, prismatic battery or sheet-type battery.

In the case of a coin-type battery, the positive electrode is obtained by forming a positive electrode material mixture into a pellet. The positive electrode material mixture contains a positive electrode active material, and optionally a conductive material, a binder, etc. In the case of a cylindrical or prismatic battery, the positive electrode is produced by, for example, applying a positive electrode material mixture paste onto each surface of a positive electrode current collector, followed by drying and rolling to form positive electrode material mixture layers on both surfaces of the positive electrode current collector. The positive electrode material mixture paste is prepared by mixing a positive electrode material mixture with a liquid component (dispersing medium).

As for the negative electrode, in the case of a coin-type battery, a metal lithium or lithium alloy punched into a pellet is used. In order to achieve good cycle characteristics, however, a pellet made of a negative electrode material mixture is preferred. The negative electrode material mixture contains a negative electrode active material, and optionally a binder, a conductive material, a thickener, etc. In the case of a cylindrical or prismatic battery, similar to the positive electrode, the negative electrode is produced by, for example, applying a negative electrode material mixture paste onto each surface of a negative electrode current collector, followed by drying and rolling to form negative electrode material mixture layers on both surfaces of the negative electrode current collector. The negative electrode material mixture paste is prepared by mixing a negative electrode material mixture with a liquid component (dispersing medium).

Although the negative electrode active material is not specifically limited, considering the reactivity with the positive electrode active material, the negative electrode active material preferably comprises silicon element. Specifically, the negative electrode active material preferably comprises at least one selected from the group consisting of silicon simple substance, a silicon oxide, a silicon carbide, a silicon nitride and a silicon alloy. Among them, particularly preferred is a silicon alloy. Also, a carbon material (e.g., graphite, graphitizable carbon material, non-graphitizable carbon material) is preferably used.

The silicon alloy preferably comprises a phase A composed mainly of silicon and a phase B comprising an intermetallic compound comprising a transition metal element and silicon element. The use of a silicon alloy comprising the phase A and the phase B effectively reduces the influence caused by expansion and makes it difficult to cause the decrease of electron conductivity. For this reason, by combining the silicon alloy with the positive electrode active material of the present invention, extremely excellent cycle life characteristics can be achieved.

The phase A performs to absorb and desorb Li, and is capable of electrochemically reacting with Li. The phase A is composed mainly of Si, but in order to achieve high capacity, the phase A is preferably composed of Si simple substance. Si simple substance, however, has poor electron conductivity because it is a semiconductor. Accordingly, it is effective to incorporate a small amount (up to about 5 wt %) of impurity into the phase A. The impurity can be, for example, phosphorus, boron, hydrogen, a transition metal, etc.

The phase B comprises an intermetallic compound comprising a transition metal element and silicon element. The intermetallic compound comprising silicon has high affinity with the phase A. Accordingly, cracks are unlikely to occur at the interface between the phase A and the phase B even when the alloy expands during charge. Moreover, because the phase B has higher electron conductivity and is more rigid than a phase comprising silicon simple substance, the phase B complements the low electron conductivity of the phase A and serves to retain the shape of alloy particles. A plural kinds of phase B may be contained in the silicon alloy. The phase B may comprise a plurality of intermetallic compounds. The phase B may comprise two or more intermetallic compounds having different compositions.

Preferably, both phase A and phase B comprise a microcrystalline or amorphous region. In the microcrystalline or amorphous region, the crystallite size is preferably not greater than 100 nm, and more preferably not less than 5 nm and not greater than 100 nm.

The crystallite size can be determined by X-ray diffractometry. Specifically, the half-width of a peak attributed to each phase is determined from a X-ray diffraction spectrum obtained by subjecting the alloy to X-ray diffractometry. The crystallite size can be calculated using the obtained half-width and the Scherrer equation. If a plurality of peaks attributed to each phase are observed, the half-width of the peak that exhibits the highest intensity is determined, which is then applied to the Scherrer equation. Usually, when the half-width is 0.09° or greater, the crystallite size is determined to be 100 nm or less.

In the silicon alloy, the content of phase A is preferably above 40 wt % and not greater than 95 wt % relative to the total weight of the phase A and the phase B, and more preferably not less than 65 wt % and not greater than 85 wt %, and particularly preferably not less than 70 wt % and not greater than 80 wt %. When the content of phase A exceeds 40 wt %, high capacity is effectively achieved. When the content of phase A is not greater than 95 wt %, an alloy having excellent electron conductivity and great shape-retaining capability is obtained. To set the content of phase A to be above 40 wt %, the amount of Si element contained in the silicon alloy is preferably 60 wt % or greater.

The transition metal element forming the intermetallic compound is preferably at least one selected from the group consisting of Ti, Zr, Ni, Cu and Fe. Particularly preferred is Ti. Silicides of titanium have higher electron conductivity and is more rigid than silicides of other elements. When the transition metal element is Ti, the amount of Si element contained in the silicon alloy (Ti—Si alloy) is preferably 72.4 to 97.7 wt %. In this case, the phase B preferably comprises $TiSi_2$.

The lithium ion-conductive non-aqueous electrolyte may be a gel electrolyte or solid electrolyte. The most commonly used is a non-aqueous solvent containing a lithium salt dissolved therein. Examples of the non-aqueous solvent include: cyclic carbonates such as ethylene carbonate (EC), propylene carbonate (PC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate, methyl propionate and ethyl propionate; γ-lactones such as γ-butyrolactone; linear ethers such as 1,2-dimethoxyethane (DME), 1,2-diethoxyethane (DEE) and ethoxymethoxyethane (EME); and cyclic ethers such as tetrahydrofuran and 2-methyltetrahydrofuran. Preferably, two or more thereof are combined.

Examples of the lithium salt dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, chloloboran lithium, lithium tetraphenylborate and imides such as lithium bispentafluoroethyl sulfonyl imide (LiN$(C_2F_5SO_2)_2$). They may be used singly or in any combination of two or more. The amount of lithium salt dissolved in the non-aqueous solvent is not specifically limited. Preferred amount is 0.2 to 2 mol/L, and more preferably 0.5 to 1.5 mol/L.

The present invention will be described below in further detail with reference to examples, but it should be understood that the present invention is not limited to the following examples. In the examples and comparative examples given below, positive electrodes and coin-type batteries are produced in the manner as described later, and evaluations are made in terms of discharge capacity and cycle life.

EXAMPLE 1

(i) Production of Positive Electrode

A mixture was prepared by mixing lithium hydroxide, electrolytic manganese dioxide and nickel hydroxide at a molar ratio Li:Mn:Ni of 1:1.6:0.4. The obtained mixture was baked at 400° C. in the air for 12 hours to obtain a manganese oxide having a cation-deficient spinel structure represented by $LiMn_{1.6}Ni_{0.4}O_{4.2}$. The composition of the active material was determined from the results of quantitative analysis of cation and oxygen. The cation was quantitatively analyzed by inductively coupled plasma (ICP) emission spectrometry, and oxygen was quantitatively analyzed by infrared absorption spectrometry.

The obtained manganese oxide (average particle size: 7 μm) was mixed with carbon black serving as a conductive material and a fluorocarbon resin (polytetrafluoroethylene) serving as a binder at a weight ratio of 90:6:4 to prepare a positive electrode material mixture. The binder was used in the state of aqueous dispersion. This positive electrode material mixture was formed into a pellet having a diameter of 4.3 mm and a thickness of 1.1 mm by applying a pressure of 1 ton/cm². Thereafter, the positive electrode pellet was dried at 250° C. in the air for 10 hours.

(ii) Production of Negative Electrode

A metal lithium foil having a thickness of 0.5 mm was punched into a pellet having a diameter of 4.3 μm. This was used as the negative electrode.

(iii) Preparation of Non-Aqueous Electrolyte

A non-aqueous electrolyte was prepared by dissolving LiN$(C_2F_5SO_2)_2$ in a solvent mixture of propylene carbonate (PC), ethylene carbonate (EC) and dimethoxyethane (DME) at a volume ratio of 3:1:3 at a LiN$(C_2F_5SO_2)_2$ concentration of 1 mol/L.

(iv) Production of Coin-Type Battery

Figure 1:
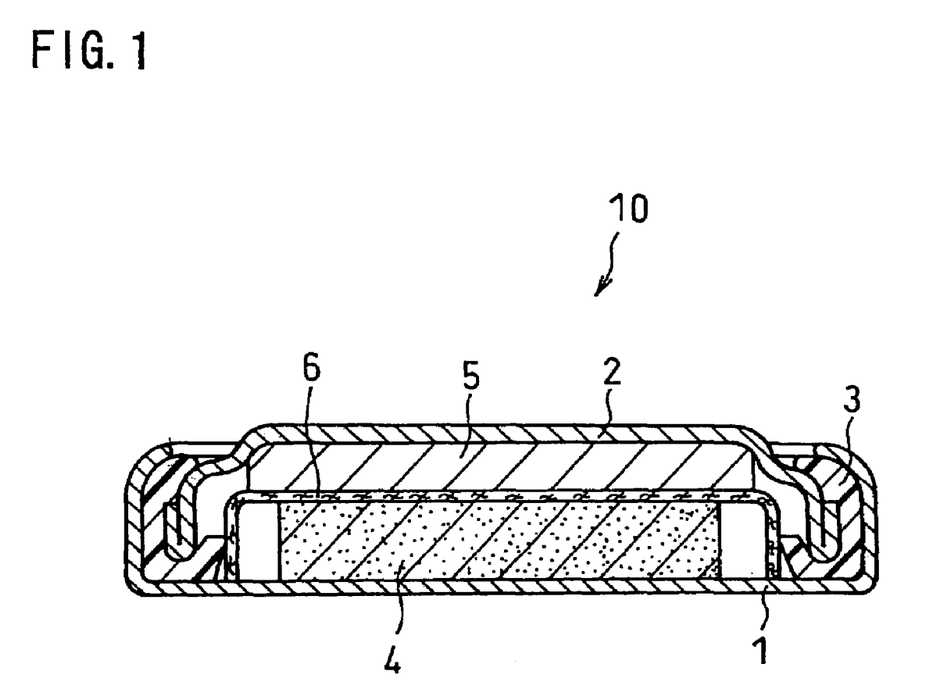
FIG. 1 is a vertical cross sectional view of a coin-type battery according to an embodiment of the present invention.

A coin-type battery 10 having an outer diameter of 6.8 mm and a thickness of 2.1 mm as shown in FIG. 1 was produced.

A positive electrode can 1 serving as the positive electrode terminal was made of highly corrosion resistant stainless steel. A negative electrode can 2 serving as the negative electrode terminal was made of the same stainless steel as the positive electrode can 1. A gasket 3 for insulating the positive electrode can 1 and the negative electrode can 2 from each other was made of polypropylene. A pitch was applied onto the interface between the positive electrode can 1 and the gasket 3 and the interface between the negative electrode can 2 and the gasket 3. A positive electrode pellet 4 was placed on the bottom of the positive electrode can 1. A negative electrode pellet 5 was press-fitted to the inner surface of the negative electrode can 2. On the top of the positive electrode pellet 4 was placed a separator 6 made of a polyethylene non-woven fabric. A non-aqueous electrolyte was injected into the positive electrode can 1, after which the positive electrode can 1 and the negative electrode can 2 were engaged to form a battery A. The battery A had a design capacity of 7.0 mAh.

EXAMPLE 2

A coin-type battery B was produced in the same manner as in EXAMPLE 1 except that the nickel hydroxide, a starting material for positive electrode active material, was replaced with iron (III) hydroxide, and that a manganese oxide represented by $LiMn_{1.6}Fe_{0.4}O_{4.2}$ (average particle size: 7 μm) was used.

EXAMPLE 3

A coin-type battery C was produced in the same manner as in EXAMPLE 1 except that the nickel hydroxide, a starting material for positive electrode active material, was replaced with titanic acid ($H_2TiO_3$), and that a manganese oxide represented by $LiMn_{1.6}Ti_{0.4}O_{4.2}$ (average particle size: 7 μm) was used.

EXAMPLE 4

A coin-type battery D was produced in the same manner as in EXAMPLE 1 except that the nickel hydroxide, a starting material for positive electrode active material, was replaced with cobalt (II) acetate, and that a manganese oxide represented by $LiMn_{1.6}Co_{0.4}O_{4.2}$ (average particle size: 7 μm) was used.

EXAMPLE 5

A coin-type battery E was produced in the same manner as in EXAMPLE 1 except that the baking atmosphere was changed to an oxygen atmosphere in the preparation of the positive electrode active material, and that a manganese oxide represented by $LiMn_{1.6}Ni_{0.4}O_{4.4}$ (average particle size: 7 μm) was used.

EXAMPLE 6

A coin-type battery F was produced in the same manner as in EXAMPLE 1 except that the baking temperature was changed to 500° C. in the preparation of the positive electrode active material, and that a manganese oxide represented by $LiMn_{1.6}Ni_{0.4}O_{4.0}$ (average particle size: 7 μm) was used.

EXAMPLE 7

A coin-type battery G was produced in the same manner as in EXAMPLE 1 except that the baking temperature was changed to 600° C. in the preparation of the positive electrode active material, and that a manganese oxide represented by $LiMn_{1.6}Ni_{0.4}O_{3.8}$ (average particle size: 7 μm) was used.

EXAMPLE 8

A coin-type battery H was produced in the same manner as in EXAMPLE 1 except that lithium hydroxide, electrolytic manganese dioxide and nickel hydroxide were mixed at a molar ratio Li:Mn:Ni of 1.2:1.44:0.36, and that a manganese oxide represented by $Li_{1.2}Mn_{1.44}Ni_{0.36}O_{4.2}$ (average particle size: 7 μm) was used.

COMPARATIVE EXAMPLE 1

A coin-type battery I was produced in the same manner as in EXAMPLE 1 except that lithium hydroxide and electrolytic manganese dioxide were mixed at a molar ratio Li:Mn of 1:2 (i.e., nickel hydroxide was not used as a starting material) in the preparation of the positive electrode active material, and that a manganese oxide represented by $LiMn_2O_{4.2}$ (average particle size: 7 μm) was used.

COMPARATIVE EXAMPLE 2

A coin-type battery J was produced in the same manner as in EXAMPLE 1 except that lithium hydroxide, electrolytic manganese dioxide and nickel hydroxide were mixed at a molar ratio Li:Mn:Ni of 1.33:1.34:0.33 in the preparation of the positive electrode active material, and that a manganese oxide represented by $Li_{1.33}Mn_{1.34}Ni_{0.33}O_4$ (average particle size: 7 μm) was used.

COMPARATIVE EXAMPLE 3

A coin-type battery K was produced in the same manner as in EXAMPLE 1 except that lithium hydroxide, electrolytic manganese dioxide and nickel hydroxide were mixed at a molar ratio Li:Mn:Ni of 0.8:1.76:0.44 in the preparation of the positive electrode active material, and that a manganese oxide represented by $Li_{0.80}Mn_{1.76}Ni_{0.44}O_{4.2}$ (average particle size: 7 μm) was used.

COMPARATIVE EXAMPLE 4

A coin-type battery L was produced in the same manner as in EXAMPLE 1 except that the baking temperature was changed to 700° C. in the preparation of the positive electrode active material, and that a manganese oxide represented by $LiMn_{1.6}Ni_{0.4}O_{3.6}$ (average particle size: 7 μm) was used.

[Evaluation 1]

(Charge/Discharge Characteristics)

The batteries A to L were subjected to a constant current charge/discharge cycle in a thermostatic chamber set at 20° C.

Figure 6:
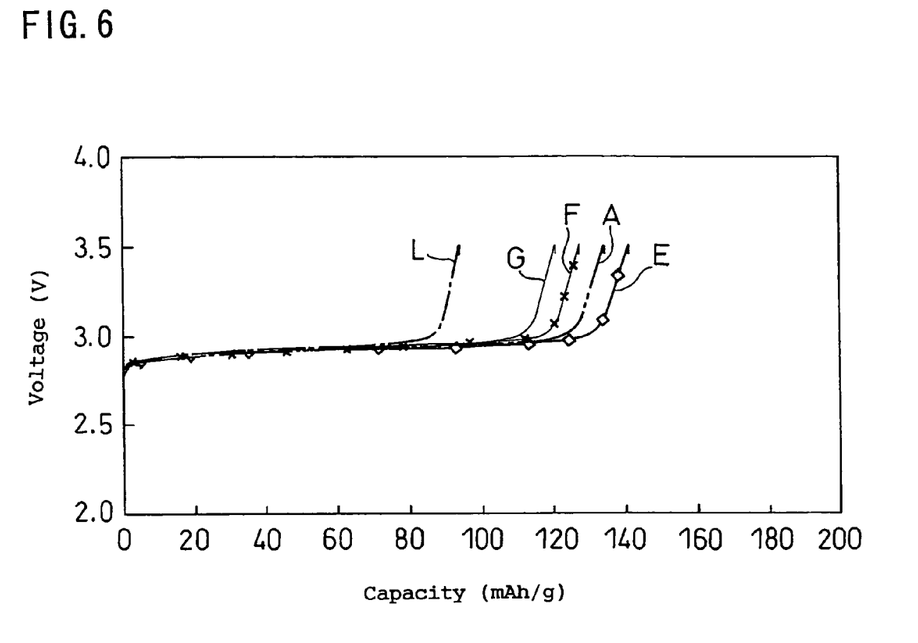
FIG. 6 shows the charge curves of batteries A, E to G according to the present invention and a battery L.

The charge was performed at a current density (a current density per facing area of the positive and negative electrodes) of 0.1 mA/cm$^2$ with an end-of-charge voltage of 3.5 V. The charge curves obtained from this charge (the relation between battery voltage versus charge capacity) are shown in FIGS. 2, 4 and 6.

The discharge was performed at a current density of 0.1 mA/cm$^2$ with an end-of-discharge voltage of 2.5 V. The discharge curves obtained from this discharge (the relation between battery voltage versus discharge capacity) are shown in FIGS. 3, 5 and 7.

Figure 2:
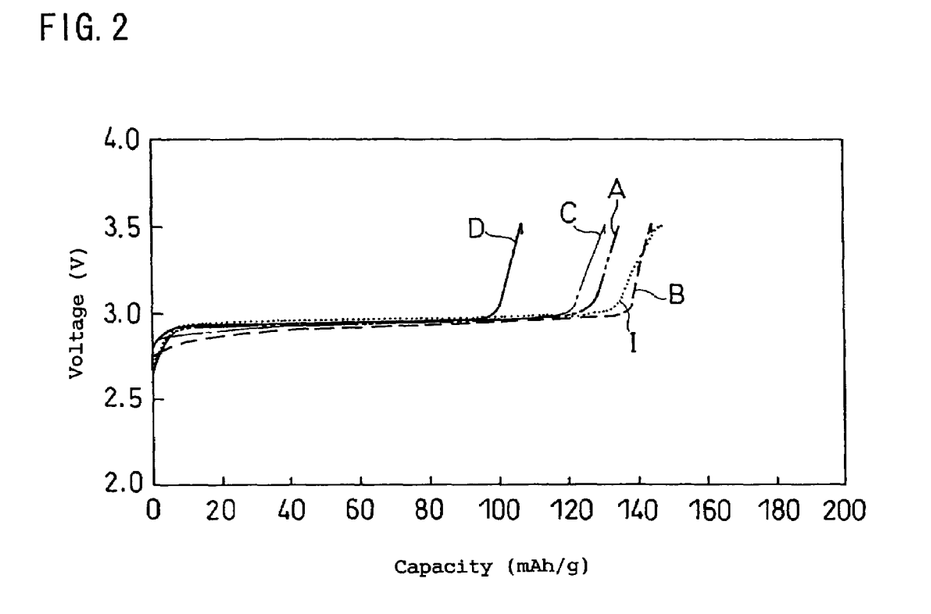
FIG. 2 shows the charge curves of batteries A to D according to the present invention and a battery I.
Figure 3:
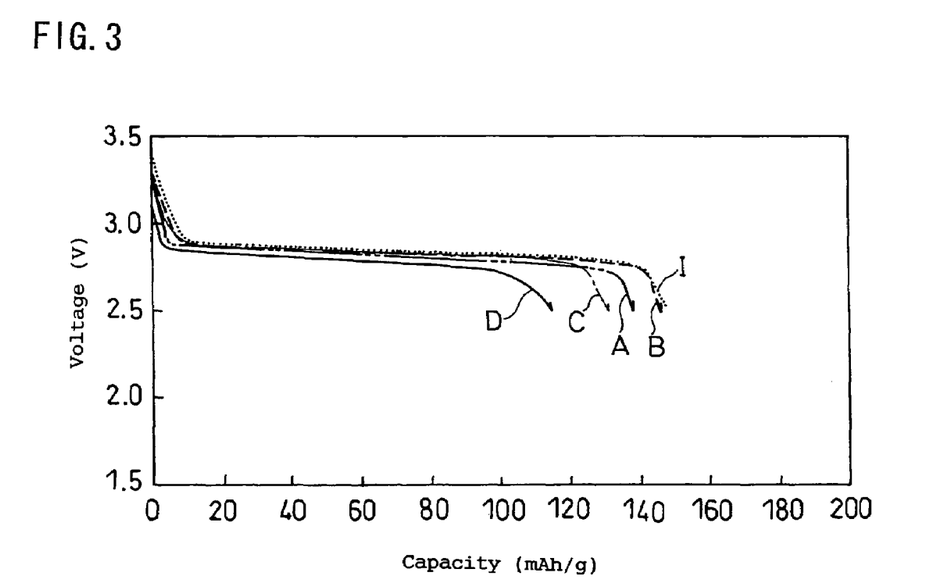
FIG. 3 shows the discharge curves of batteries A to D according to the present invention and a battery I.

FIGS. 2 and 3 illustrate that the charge capacity decreases by partly replacing Mn with a transition metal element M having an oxidation number of two or greater. When Ti, Ni or Fe is used as the element M, however, the charge capacity and the discharge capacity increase. Particularly when Fe is used, the highest capacity is obtained.

Figure 4:
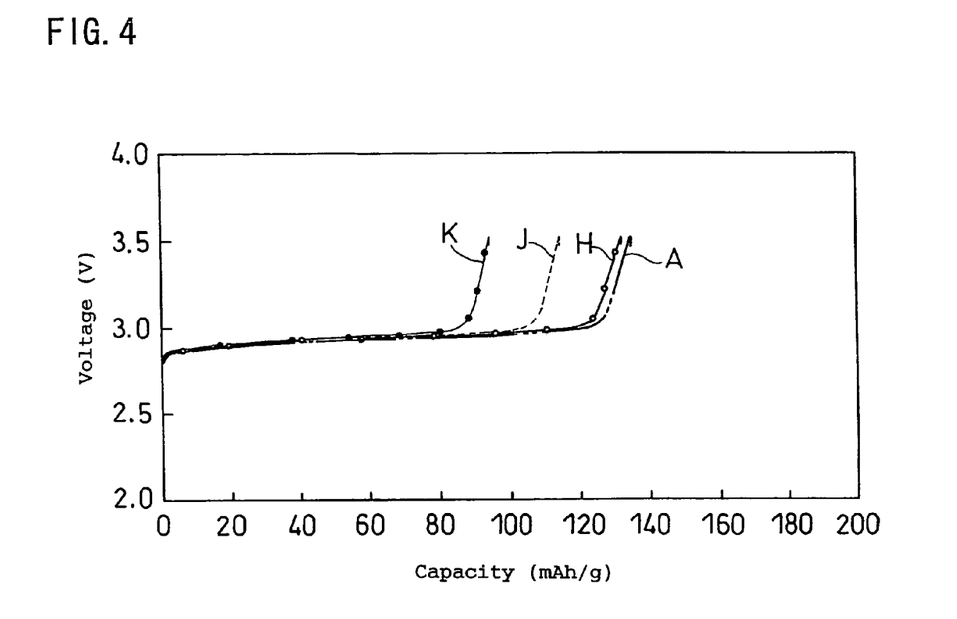
FIG. 4 shows the charge curves of batteries A and H according to the present invention and batteries J and K.
Figure 5:
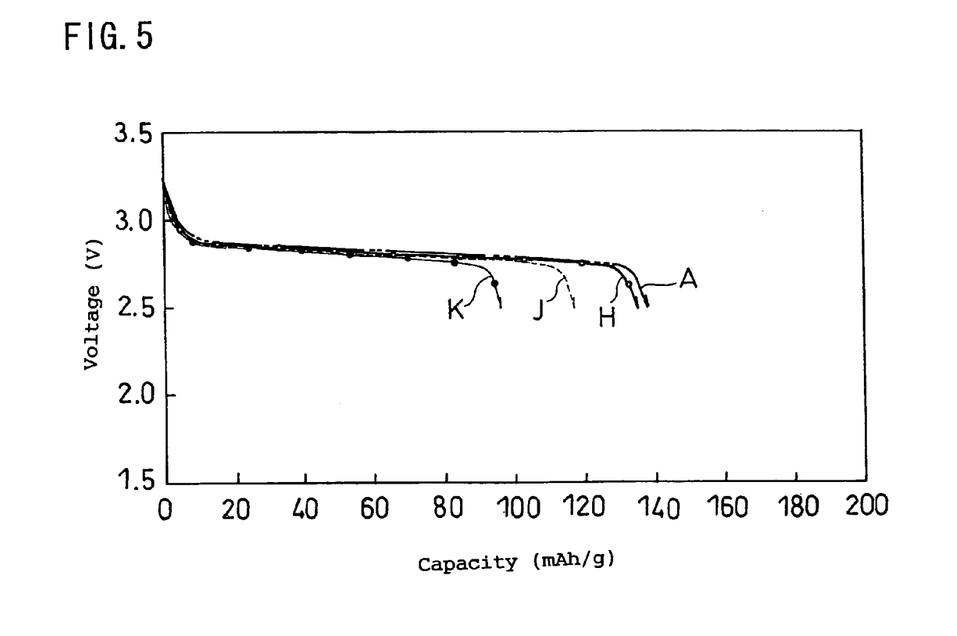
FIG. 5 shows the discharge curves of batteries A and H according to the present invention and batteries J and K.

FIGS. 4 and 5 illustrate that when the molar ratio of Li to Mn in the positive electrode active material is either too small (a=−0.2) or too large (a=0.33), the discharge capacity becomes small.

Figure 7:
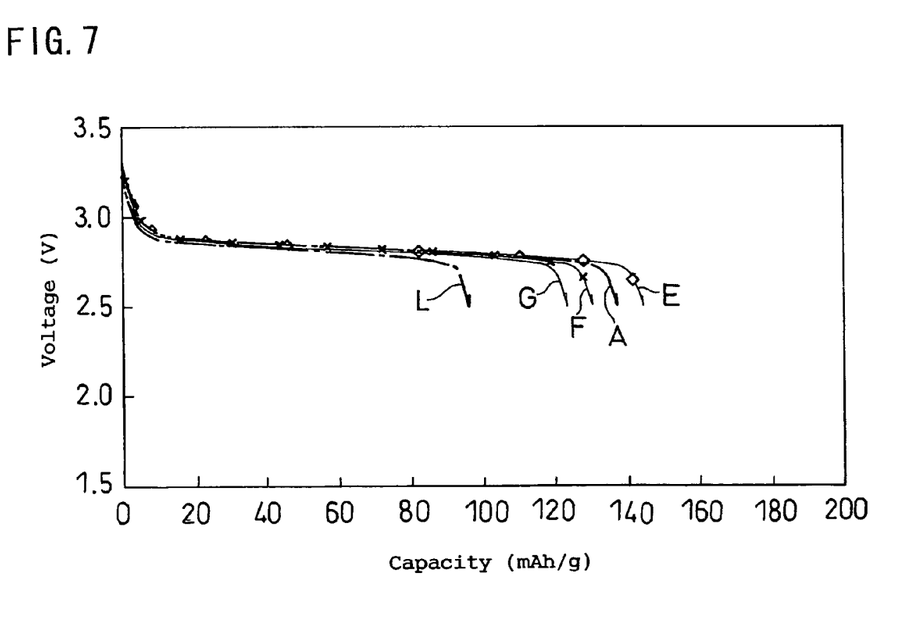
FIG. 7 shows the discharge curves of batteries A, E to G according to the present invention and a battery L.

FIGS. 6 and 7 illustrate that as the amount of oxygen is increased in the positive electrode active material, the discharge capacity increases. When the value of "y" is too small (y=−0.4), the discharge capacity decreases significantly.

(Cycle Life)

The batteries A to C and I were subjected to constant current charge/discharge cycles (50 cycles) in a thermostatic chamber set at 20° C.

The charge was performed at a current density of 0.4 mA/cm$^2$ with an end-of-charge voltage of 3.5 V.

The discharge was performed at a current density of 0.4 mA/cm$^2$ with an end-of-discharge voltage of 2.5 V.

The rate of decrease of discharge capacity at the 50th cycle relative to discharge capacity at the second cycle was determined in percentage (%), which was denoted as cycle deterioration rate. As the cycle deterioration rate approaches to 0(%), it indicates that the cycle life is better.

The cycle deterioration rates of EXAMPLEs 1, 2 and 3 and COMPARATIVE EXAMPLE 1 (i.e., the batteries A, B, C and I) were 0.08%, 0.09%, 0.18% and 0.38%, respectively.

Figure 8:
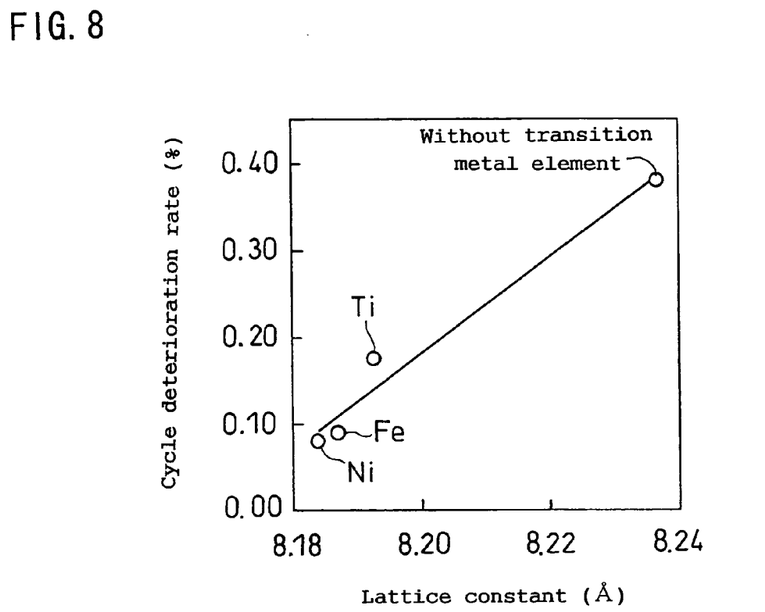
FIG. 8 is a graph showing cycle deterioration rate versus lattice constant of manganese oxide.

The manganese oxides of EXAMPLEs 1, 2 and 3 and COMPARATIVE EXAMPLE 1 had lattice constants of 8.184, 8.187, 8.193 and 8.237 angstroms, respectively. The relation between cycle deterioration rate versus lattice constant of manganese oxide was plotted in FIG. 8. The lattice constants were determined by Rietveld method using the results of X-ray diffractometry using CuKα radiation.

EXAMPLE 9

Manganese oxides having a compositional formula: $LiMn_{2-x}Ni_xO_{4+y}$ (where x=0, 0.05, 0.10, 0.15, 0.17, 0.2, 0.3, 0.4, 0.5, 0.6 or 0.8) were prepared in the same manner as in EXAMPLE 1 except that the mixing ratio between nickel hydroxide and electrolytic manganese dioxide was changed. The value of "y" ranged from 0 to 0.3. The manganese oxides had an average particle size of 5 to 10 μm. Note that the manganese oxides whose value of "x" is 0, 0.05, 0.10, 0.15, 0.6 and 0.8 correspond to comparative examples.

The obtained manganese oxides were analyzed in the same manner as described above for charge/discharge characteristics and cycle life. The relation between the discharge capacity obtained from the discharge curves versus the value of "x" representing the amount of nickel was plotted in FIG. 9. Likewise, the relation between the cycle deterioration rate and the value of "x" was plotted in FIG. 10.

EXAMPLE 10

Manganese oxides having a compositional formula: $LiMn_{2-x}Fe_xO_{4+y}$ (where x=0, 0.05, 0.10, 0.15, 0.17, 0.2, 0.3, 0.4, 0.5, 0.6 or 0.8) were prepared in the same manner as in EXAMPLE 2 except that the mixing ratio between iron hydroxide and electrolytic manganese dioxide was changed. The value of "y" ranged from 0 to 0.3. The manganese oxides had an average particle size of 5 to 10 μm. Note that the manganese oxides whose value of "x" is 0, 0.05, 0.10, 0.15, 0.6 and 0.8 correspond to comparative examples.

The obtained manganese oxides were analyzed in the same manner as described above for charge/discharge characteristics and cycle life. The relation between the discharge capacity obtained from the discharge curves versus the value of "x" representing the amount of iron was plotted in FIG. 9. Likewise, the relation between the cycle deterioration rate and the value of "x" was plotted in FIG. 10.

EXAMPLE 11

Manganese oxides having a compositional formula: $LiMn_{2-x}Ti_xO_{4+y}$ (where x=0, 0.05, 0.10, 0.15, 0.17, 0.2, 0.3, 0.4, 0.5, 0.6 or 0.8) were prepared in the same manner as in EXAMPLE 3 except that the mixing ratio between titanic acid and electrolytic manganese dioxide was changed. The value of "y" ranged from 0 to 0.3. The manganese oxides had an average particle size of 5 to 10 μm. Note that the manganese oxides whose value of "x" is 0, 0.05, 0.10, 0.15, 0.6 and 0.8 correspond to comparative examples.

The obtained manganese oxides were analyzed in the same manner as described above for charge/discharge characteristics and cycle life. The relation between the discharge capacity obtained from the discharge curves versus the value of "x" representing the amount of titanium was plotted in FIG. 9. Likewise, the relation between the cycle deterioration rate and the value of "x" was plotted in FIG. 10.

Figure 9:
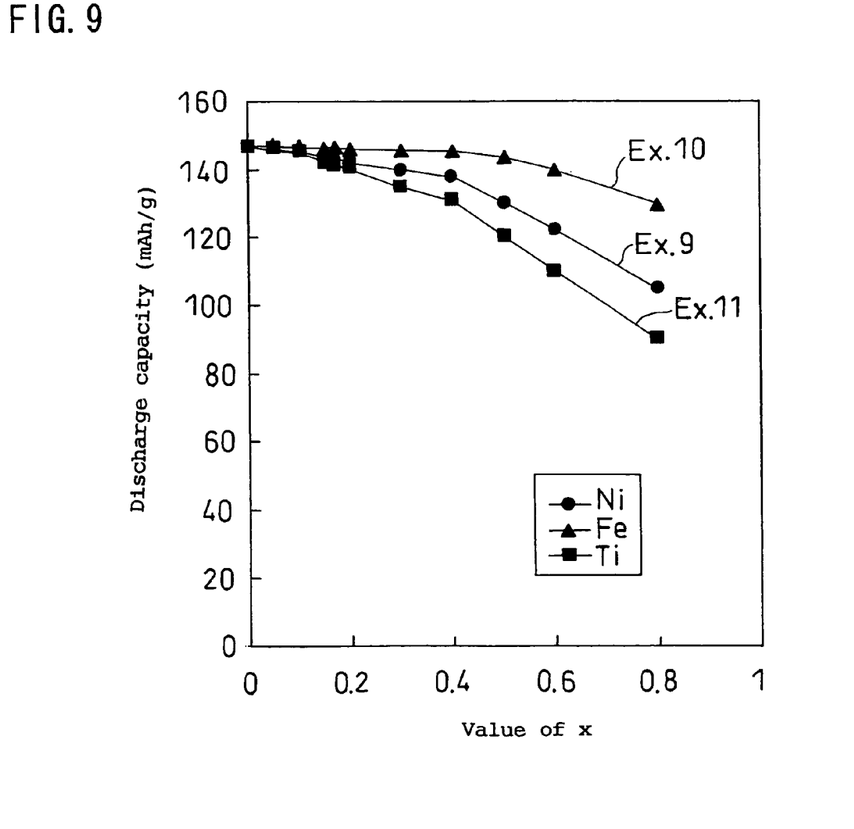
FIG. 9 is a graph showing the value of "x" representing the amount of element M contained in a manganese oxide versus discharge capacity.

FIG. 9 indicates that as the value of "x" is increased, the discharge capacity decreases. Particularly when the value of "x" exceeds 0.5, the rate of decrease in capacity is large. This indicates that the value of "x" is preferably 0.5 or less in terms of capacity.

Figure 10:
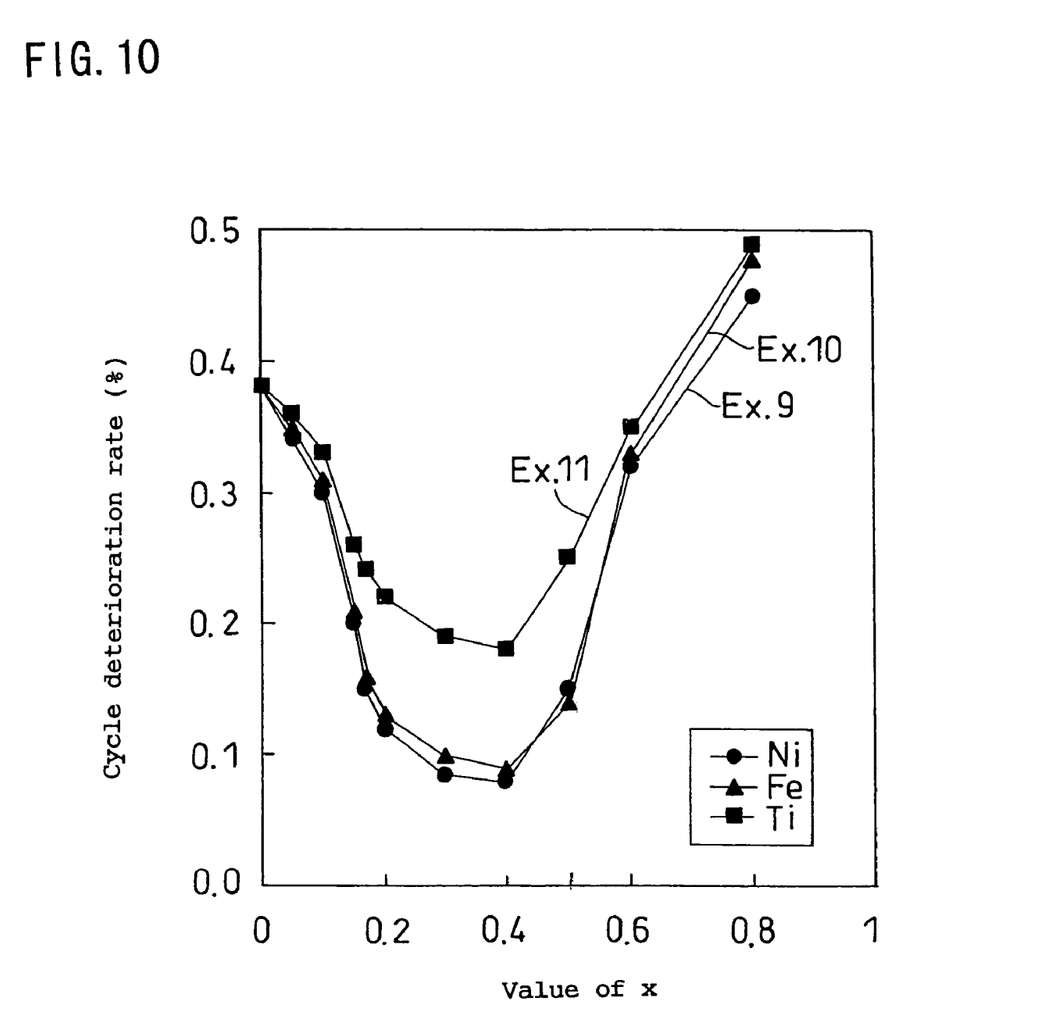
FIG. 10 is a graph showing the value of "x" representing the amount of element M contained in a manganese oxide versus cycle deterioration rate.

FIG. 10 indicates that when the value of "x" is 0.17 or greater, the cycle deterioration rate becomes extremely low. The cycle deterioration rate becomes the lowest when the value of "x" is around 0.4. When the value of "x" exceeds 0.4, the cycle deterioration rate increases gradually, but sufficiently low cycle deterioration rate is maintained until the value of "x" is 0.5 (x=0.5).

EXAMPLE 12

Figure 11:
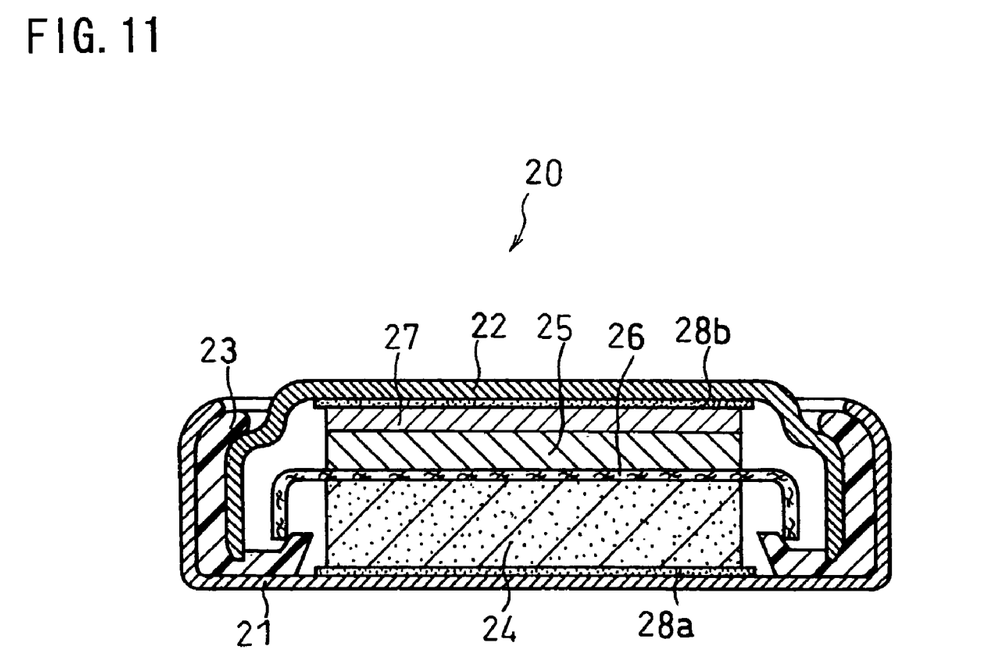
FIG. 11 is a vertical cross sectional view of a coin-type battery according to another embodiment of the present invention.

A coin-type battery 20 (design capacity: 5.8 mAh) having an outer diameter of 6.8 mm and a thickness of 2.1 mm as shown in FIG. 11 was produced in the same manner as in EXAMPLE 1 except that the negative electrode was changed.

(i) Production of Negative Electrode

A negative electrode material mixture was prepared by mixing a silicon simple substance powder (average particle size: 3 μm), a graphite powder (average particle size: 3 μm) serving as a conductive material, and non-crosslinked polyacrylic acid (with a weight average molecular weight of about 300000 available from Nihon Junyaku Co., Ltd.) at a weight ratio of 70:23:7. The obtained negative electrode material mixture was formed into a pellet having a diameter of 4.2 mm and a thickness of 0.3 mm by applying a pressure of 1 ton/cm$^2$. Thereafter, the negative electrode pellet was dried at 160° C. in the air for 10 hours.

(ii) Production of Coin-Type Battery

A positive electrode can 21 serving as the positive electrode terminal was made of highly corrosion resistant stainless steel. A negative electrode can 22 serving as the negative electrode terminal was also made of the same stainless steel as the positive electrode can 21. As a gasket 23 for insulating the positive electrode can 21 and the negative electrode can 22 from each other, propylene was used. Pitch was applied onto the interface between the positive electrode can 21 and the gasket 23 as well as that between the negative electrode can 22 and the gasket 23. A carbon paste 28a was applied onto the inner surface of the positive electrode can 21, and a carbon paste 28b was applied onto the inner surface of the negative electrode can 22.

The silicon contained in the negative electrode pellet 25 needs to be alloyed with lithium. For this reason, a lithium foil 27 was attached by pressure onto the surface of the negative electrode 25 such that the molar ratio would be Li:Si of 2.6:1. After a battery was assembled, the lithium foil 27 was absorbed into the silicon contained in the negative electrode in the presence of non-aqueous electrolyte.

A positive electrode pellet 24 was placed on the bottom surface of the positive electrode can 21. A negative electrode pellet 25 was attached by pressure onto the inner surface of the negative electrode can 22 with its surface having the lithium foil 27 attached thereto facing the inner surface of the negative electrode can 22. Onto the positive electrode 24 was placed a separator 26 made of a polyethylene non-woven fabric. A non-aqueous electrolyte was injected into the positive electrode can 21, after which the positive electrode can 21 and the negative electrode can 22 were engaged. Thereby, a battery X was produced.

EXAMPLE 13

A coin-type battery was produced in the same manner as in EXAMPLE 12 except that the negative electrode was changed.

A negative electrode pellet was produced in the same manner as in EXAMPLE 12 except that, instead of the silicon simple substance powder, a silicon oxide (average particle size: 3 μm) represented by SiO was used. A coin-type battery Y was produced in the same manner as in EXAMPLE 12. A lithium foil was attached by pressure onto the surface of the negative electrode such that the molar ratio of Li:Si would be 2.6:1.

EXAMPLE 14

Coin-type batteries were produced in the same manner as in EXAMPLE 12 except that the negative electrodes were changed.

Negative electrode pellets were produced in the same manner as in EXAMPLE 12 except that, instead of the silicon simple substance powder, silicon alloys (average particle size: 3 μm) were used. Coin-type batteries Za to Ze were produced in the same manner as in EXAMPLE 12. A lithium foil was attached by pressure onto the surface of the negative electrode such that the molar ratio of Li:Si would be 2.6:1.

The silicon alloys were produced as follows.

As the transition metal element starting materials to be alloyed with silicon, metal Ti, metal Zr, metal Ni, metal Cu and metal Fe were used. They all had a purity of 99.9 wt % and were in the form of powders having a particle size of 100 to 150 μm. As the silicon starting material, a silicon simple substance powder (purity: 99.9 wt %, average particle size: 3 μm) was used.

The starting materials were mixed at the following weight ratios so that the content of phase A would be about 20 wt % relative to the total of the phase A comprising silicon simple substance and the phase B comprising the intermetallic compound.

Ti:Si=36.8:63.2
Zr:Si=49.5:50.5
Ni:Si=40.9:59.1
Cu:Si=42.5:57.5
Fe:Si=39.9:60.1

Each mixed powder weighed to 1.7 kg was introduced into a container of a vibration mill (Model FV-20 manufactured by Chuo Kakohki Co., Ltd.). Then, into the container were introduced stainless steel balls (diameter: 2 cm) in an amount of 300 kg. The container was evacuated to a vacuum, into which Ar (with a purity of 99.999% available from Nippon Sanso Corporation) was then introduced, and the pressure of the container was adjusted to 1 atmosphere. The mill was operated at a vibration amplitude of 8 mm and a rotation rate of 1200 rpm. Under the conditions, mechanical alloying was performed for 80 hours.

A Ti—Si alloy, a Zr—Si alloy, a Ni—Si alloy, a Cu—Si alloy and a Fe—Si alloy obtained from the mechanical alloying were collected and sieved to a particle size of 45 μm or less.

The obtained alloys were each analyzed by X-ray diffractometry using a CuKα radiation. As a result, spectra indicating the microcrystalline state were obtained. Using the half-width of the diffraction peak having the highest intensity observed at 2θ=10° to 80° and the Scherrer equation, the crystallite size of each alloy was calculated. The alloys had a crystallite size of about 10 nm.

The results of the X-ray diffractometry showed the presence of phase A composed of Si simple substance in each alloy. Also, they showed that the Ti—Si alloy, Zr—Si alloy, Ni—Si alloy, Cu—Si alloy and Fe—Si alloy comprised a phase B comprising $TiSi_2$, a phase B comprising $ZrSi_2$, a phase B comprising $NiSi_2$, a phase B comprising $CuSi_2$ and a phase B comprising $FeSi_2$, respectively.

Batteries produced by using the Ti—Si alloy, Zr—Si alloy, Ni—Si alloy, Cu—Si alloy and Fe—Si alloy are referred to as batteries Za to Ze, respectively.

[Evaluation 2]

The batteries of EXAMPLEs 12 to 14 were evaluated in the same manner as described above in terms of charge/discharge characteristics and cycle life. Table 1 shows discharge capacity obtained from discharge curve and cycle deterioration rate.

TABLE 1

| Battery | Discharge capacity (mAh) | Cycle deterioration rate (%) |
|---|---|---|
| X | 5.8 | 0.07 |
| Y | 5.0 | 0.05 |
| Za | 5.4 | 0.02 |
| Zb | 5.2 | 0.04 |
| Zc | 5.3 | 0.04 |
| Zd | 5.1 | 0.03 |
| Ze | 5.3 | 0.04 |

Table 1 clearly indicates that the use of negative electrode active material comprising silicon element provides a battery having high capacity and excellent cycle life.

Particularly when the negative electrode active material was combined with a silicon alloy, the most excellent results were obtained. Presumably, this is because the silicon alloy had the lowest crystallinity, and the expansion and contraction of the active material during charge/discharge was reduced.

Among the silicon alloys, particularly when a Ti—Si alloy was used, the most excellent results were obtained. Presumably, this is because the Ti—Si alloy had the highest electron conductivity.

The present invention is applicable to various kinds of non-aqueous electrolyte secondary batteries using a manganese oxide having a spinel structure.

The present invention is particularly useful for a non-aqueous electrolyte secondary battery designed to be repeatedly charged and discharged at around 3 V (e.g., 2.5 to 3.5 V).

The present invention is applicable to any non-aqueous electrolyte secondary battery such as those for use as power sources for driving electronic devices for consumer use, personal digital assistants, portable electronic devices, portable appliances and cordless devices. The present invention is also applicable as power sources for compact electrical energy storage system for home use, two-wheeled vehicles, electric vehicles and hybrid electric vehicles.

The shape of the battery is not specifically limited, and the battery of the present invention can be in various shapes such as coin, button, sheet, cylinder, flat-shape and prism. The formation of the electrode assembly including positive and negative electrodes is not limited, either. The electrode assembly can be, for example, a spirally wound design, stack design, etc. The size of the battery is not limited, and the battery of the present invention can be in various sizes from small to large.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material for a non-aqueous electrolyte secondary battery comprising:

a manganese oxide having a spinel structure, said manganese oxide being represented by the general formula: $Li_{1+a}Mn_{2-x-a}M_xO_{4+y}$, where M is one or more transition metal elements having an oxidation number of 2 or greater, $M \neq Mn$, $0.17 \leq x \leq 0.5$, $0.2 \leq y \leq 0.5$ and $0 \leq a \leq 0.2$, wherein said manganese oxide has a lattice constant of 8.16 angstroms to 8.2 angstroms.

2. The positive electrode active material for a non-aqueous electrolyte secondary battery in accordance with claim 1, wherein said one or more transition metal elements comprises at least one element selected from the group consisting of Ni, Fe and Ti.

3. The positive electrode active material for a non-aqueous electrolyte secondary battery in accordance with claim 1, wherein said manganese oxide has an average particle size of 1 μm to 30 μm.

4. The positive electrode active material for a non-aqueous electrolyte secondary battery in accordance with claim 1, wherein, when said positive electrode active material is charged using a counter electrode comprising a metal lithium, a charge capacity of said positive electrode active material obtained until a potential thereof relative to said counter electrode reaches 2.5 V to 3.0 V is 110 mAh/g or more.

5. A positive electrode active material for a non-aqueous electrolyte secondary battery comprising:

a manganese oxide having a spinel structure, said manganese oxide being represented by the general formula: $Li_{1+a}Mn_{2-\alpha-\beta-a}M^1_{\alpha}M^2_{\beta}O_{4+y}$, where $M^1$ is at least one element selected from the group consisting of Ni and Fe, $M^2$ is a transition metal element other than Ni and Fe having an oxidation number of two or greater, $\alpha+\beta=x$, $0<\alpha$, $0 \leq \beta$, $0.1 \leq x \leq 0.5$, $0.2<y \leq 0.5$ and $0 \leq a \leq 0.2$, wherein said manganese oxide has a lattice constant of 8.16 angstroms to 8.2 angstroms.

6. A non-aqueous electrolyte secondary battery comprising:

a positive electrode containing a positive electrode active material, said positive electrode active material comprising:

a manganese oxide having a spinel structure, said manganese oxide being represented by the general formula: $Li_{1+a}Mn_{2-x-a}M_xO_{4+y}$, where M is one or more transition metal elements having an oxidation number of 2 or greater, $M \neq Mn$, $0.17 \leq x \leq 0.5$, $0.2 < y \leq 0.5$ and $0 \leq a \leq 0.2$ a negative electrode containing a negative electrode active material, and a lithium ion-conductive non-aqueous electrolyte, wherein an end-of-charge voltage of said battery is set to 3.5 V or less, and an end-of-discharge voltage of said battery is set to 2.5 V or greater.

7. The non-aqueous electrolyte secondary battery in accordance with claim 6, wherein said negative electrode active material comprises at least one selected from the group consisting of silicon simple substance, a silicon oxide, a silicon carbide, a silicon nitride and a silicon alloy.

8. The non-aqueous electrolyte secondary battery in accordance with claim 7, wherein said silicon alloy comprises a phase A composed mainly of silicon and a phase B comprising an intermetallic compound comprising one or more transition metal elements and silicon element, and said one or more transition metal elements comprises at least one element selected from the group consisting of Ti, Zr, Ni, Cu and Fe.

9. The non-aqueous electrolyte secondary battery in accordance with claim 8, wherein said intermetallic compound comprises $TiSi_2$.

10. A charge/discharge system comprising:

a non-aqueous electrolyte secondary battery, a charger for charging said non-aqueous electrolyte secondary battery, and a discharge controller for said non-aqueous electrolyte secondary battery, said non-aqueous electrolyte secondary battery comprising a positive electrode containing a positive electrode active material, a negative electrode containing a negative electrode active material and a lithium ion-conductive non-aqueous electrolyte, said positive electrode active material comprising a manganese oxide having a spinel structure, said manganese oxide being represented by the general formula: $Li_{1+a}Mn_{2-x-a}M_xO_{4+y}$, where M is a transition metal element having an oxidation number of 2 or greater, $M \neq Mn$, $0.17 \leq x \leq 0.5$, $0.2 < y \leq 0.5$ and $0 \leq a \leq 0.2$, said charger being set to have an end-of-charge voltage of said battery of 3.5 V or less, and said discharge controller being set to have an end-of-discharge voltage of said battery of 2.5 V or greater.

11. The non-aqueous electrolyte secondary battery in accordance with claim 6, wherein $0.2 \leqq y \leqq 0.5$.

12. The non-aqueous electrolyte secondary battery in according with claim 6, wherein said negative electrode active material comprises silicon element.

13. The charge/discharge system in accordance with claim 10, wherein $0.2 \leqq y \leqq 0.5$.

14. The charge/discharge system in accordance with claim 10, wherein said negative electrode active material comprises silicon element.

* * * * *